(12) United States Patent
Schappert

(10) Patent No.: US 10,406,850 B2
(45) Date of Patent: Sep. 10, 2019

(54) PRINTABLE FILM

(71) Applicant: 3M INNOVATIVE PROPERTIES COMPANY, St. Paul, MN (US)

(72) Inventor: Klaus D. Schappert, Moers (DE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 958 days.

(21) Appl. No.: 14/342,441

(22) PCT Filed: Oct. 4, 2012

(86) PCT No.: PCT/US2012/058693
§ 371 (c)(1),
(2) Date: Mar. 3, 2014

(87) PCT Pub. No.: WO2013/052624
PCT Pub. Date: Apr. 11, 2013

(65) Prior Publication Data
US 2014/0209231 A1 Jul. 31, 2014

(30) Foreign Application Priority Data
Oct. 7, 2011 (EP) .................................. 11184298

(51) Int. Cl.
| C08L 33/04 | (2006.01) |
| --- | --- |
| C08L 33/06 | (2006.01) |
| C08L 67/00 | (2006.01) |
| C08L 67/02 | (2006.01) |
| C08L 67/03 | (2006.01) |
| C09D 11/033 | (2014.01) |
| B32B 7/00 | (2019.01) |
| B32B 7/04 | (2019.01) |
| B32B 7/12 | (2006.01) |
| B44C 1/10 | (2006.01) |
| B44C 1/16 | (2006.01) |
| B32B 27/06 | (2006.01) |
| B32B 27/08 | (2006.01) |
| B32B 27/20 | (2006.01) |
| B32B 27/30 | (2006.01) |
| B32B 27/36 | (2006.01) |
| B32B 37/12 | (2006.01) |
| B32B 38/00 | (2006.01) |
| B32B 38/14 | (2006.01) |
| B44C 1/165 | (2006.01) |

(Continued)

(52) U.S. Cl.
CPC .......... *B44C 1/105* (2013.01); *B41M 5/0047* (2013.01); *B41M 5/0064* (2013.01); *B41M 5/508* (2013.01); *B41M 5/5254* (2013.01); *B41M 5/5272* (2013.01); *C08L 67/03* (2013.01); *B32B 7/00* (2013.01); *B32B 7/04* (2013.01); *B32B 7/12* (2013.01); *B32B 27/06* (2013.01); *B32B 27/08* (2013.01); *B32B 27/20* (2013.01); *B32B 27/30* (2013.01); *B32B 27/308* (2013.01); *B32B 27/36* (2013.01); *B32B 37/12* (2013.01); *B32B 38/14* (2013.01); *B32B 38/145* (2013.01); *B32B 2307/4023* (2013.01); *B32B 2307/50* (2013.01); *B32B 2307/54* (2013.01); *B32B 2307/702* (2013.01); *B32B 2307/75* (2013.01); *B32B 2333/08* (2013.01); *B32B 2367/00* (2013.01); *B32B 2405/00* (2013.01); *B32B 2519/00* (2013.01); *B44C 1/10* (2013.01); *B44C 1/16* (2013.01); *B44C 1/165* (2013.01); *C08L 23/04* (2013.01); *C08L 23/08* (2013.01); *C08L 23/0846* (2013.01); *C08L 23/147* (2013.01); *C08L 33/04* (2013.01); *C08L 33/06* (2013.01); *C08L 67/00* (2013.01); *C08L 67/02* (2013.01); *C09D 11/033* (2013.01); *Y10T 156/10* (2015.01); *Y10T 428/24802* (2015.01); *Y10T 428/28* (2015.01); *Y10T 428/2848* (2015.01); *Y10T 428/31786* (2015.04); *Y10T 428/31935* (2015.04)

(58) Field of Classification Search
None
See application file for complete search history.

(56) References Cited

U.S. PATENT DOCUMENTS

| 2,736,721 A | 2/1956 | Dester |
| --- | --- | --- |
| RE24,906 E | 12/1960 | Ulrich |

(Continued)

FOREIGN PATENT DOCUMENTS

| EP | 0 279 579 | 8/1988 |
| --- | --- | --- |
| EP | 1 932 677 | 6/2008 |

(Continued)

OTHER PUBLICATIONS

PCT International Search Report for PCT/US2012/058693 dated Jan. 24, 2013, 4 pages.

(Continued)

*Primary Examiner* — Vivian Chen
(74) *Attorney, Agent, or Firm* — Daniel J. Iden

(57) ABSTRACT

The present application relates to a film having a polyester layer comprising a blend of amorphous polyester and a copolymer of an olefin and a hydrocarbon ester of an acrylic acid, wherein the amount of copolymer is at least 30 parts per 100 parts by weight of amorphous polyester and wherein the polyester layer exhibits an E-modulus at 23 C of at least 200 N/mm2?. The application further discloses a method of making graphic with the film, in particular by ink jet printing and further discloses a method of applying the graphic to a substrate such as a building or a vehicle.

15 Claims, No Drawings

(51) Int. Cl.
*C08L 23/04* (2006.01)
*C08L 23/08* (2006.01)
*C08L 23/14* (2006.01)
*B41M 5/00* (2006.01)
*B41M 5/50* (2006.01)
*B41M 5/52* (2006.01)

(56) References Cited

U.S. PATENT DOCUMENTS

| | | | |
|---|---|---|---|
| 4,042,648 A * | 8/1977 | Kitamura | C08L 23/10 525/211 |
| 4,181,752 A | 1/1980 | Martens et al. | |
| 4,418,120 A | 11/1983 | Kealy et al. | |
| 4,833,179 A | 5/1989 | Young et al. | |
| 4,968,562 A | 11/1990 | Delgado | |
| 4,994,322 A | 2/1991 | Delgado et al. | |
| 5,141,790 A | 8/1992 | Calhoun et al. | |
| 5,187,230 A * | 2/1993 | Udipi | C08L 67/02 525/133 |
| 5,209,971 A | 5/1993 | Babu et al. | |
| 5,296,277 A | 3/1994 | Wilson et al. | |
| 5,362,516 A | 11/1994 | Wilson et al. | |
| 5,461,134 A | 10/1995 | Leir et al. | |
| 5,643,666 A * | 7/1997 | Eckart | B32B 27/08 428/15 |
| 5,643,991 A * | 7/1997 | Stipe | C08K 3/04 524/496 |
| 5,712,031 A | 1/1998 | Kelch et al. | |
| 6,010,564 A * | 1/2000 | Zhu | C09D 11/36 106/31.37 |
| 6,042,930 A | 3/2000 | Kelch et al. | |
| 6,066,694 A * | 5/2000 | Chisholm | C08L 67/02 524/147 |
| 6,106,982 A | 8/2000 | Mientus et al. | |
| 6,113,679 A | 9/2000 | Adkins et al. | |
| 6,197,397 B1 | 3/2001 | Sher et al. | |
| H1982 H * | 8/2001 | Dunn | B05D 1/36 427/258 |
| 6,503,549 B1 * | 1/2003 | Mueller | B32B 27/36 426/396 |
| 6,549,824 B1 | 4/2003 | Satou et al. | |
| 6,613,411 B2 * | 9/2003 | Kollaja | B44C 1/105 428/343 |
| 6,846,075 B2 | 1/2005 | Ylitalo et al. | |
| 6,869,496 B1 * | 3/2005 | Kollaja | B44C 1/105 156/275.7 |
| 2003/0107635 A1 | 6/2003 | Kinning et al. | |
| 2003/0224150 A1 | 12/2003 | Ludwig et al. | |
| 2003/0235681 A1 | 12/2003 | Sebastian et al. | |
| 2004/0259034 A1 * | 12/2004 | Schadebrodt | B41C 1/00 430/300 |
| 2005/0153084 A1 * | 7/2005 | Shi | C08L 67/02 428/35.7 |
| 2006/0057347 A1 | 3/2006 | Squier et al. | |
| 2006/0115627 A1 | 6/2006 | Dontula et al. | |
| 2006/0188734 A1 | 8/2006 | Valentage et al. | |
| 2007/0010650 A1 * | 1/2007 | Crawford | A01G 9/1438 528/302 |
| 2008/0103258 A1 * | 5/2008 | McGee | C09J 123/0869 525/221 |
| 2009/0047450 A1 | 2/2009 | Riedl et al. | |
| 2009/0285511 A1 | 11/2009 | Aithani | |

FOREIGN PATENT DOCUMENTS

| | | |
|---|---|---|
| EP | 2 353 881 | 8/2011 |
| JP | 2006-168002 | 6/2006 |
| WO | WO 92/13924 | 8/1992 |
| WO | WO 93/12147 | 6/1993 |
| WO | WO 95/13331 | 5/1995 |

OTHER PUBLICATIONS

Satas, Ed. D, "*Handbook of Pressure-Sensitive Adhesive Technology*", $2^{nd}$ edition (1989).

Encyclopedia of Polymer Science and Engineering, vol. 13, 1964.

* cited by examiner

PRINTABLE FILM

BACKGROUND

The present invention relates to printable films. In a particular aspect, the invention relates to films that are receptive to solvent-based inkjet inks and methods of printing onto such films. In particular, the present invention relates to melt-processed films that are receptive to solvent-based inkjet inks and methods of printing onto such films to make a graphic suitable for application on vehicles or buildings. A variety of graphics for advertising and promotional displays may be produced. The invention further relates to a method of applying a graphic.

A variety of print methods have been employed for imaging various sheet materials. Commonly employed print methods include gravure, off-set, flexographic, lithographic, electrographic, electrophotographic (including laser printing and xerography), ion deposition (also referred to as electron beam imaging (EBI)), magnetographics, inkjet printing, screen printing, and thermal mass transfer. More detailed information concerning such methods is available in standard printing textbooks.

To date, many of the graphic films employed are PVC based films that typically combine good printability with desired properties in the graphics application including such properties as long term durability (e.g. several years), easy application, good adherence also to uneven surfaces including for example surfaces with rivets with minimal or no tendency of the film popping up. However, there is a desire to replace the PVC based films with non-PVC based film. Unfortunately, balancing the beneficial printing properties with desired properties in the graphics application have been proven difficult.

In particular in the case of non-contact printing methods, such as inkjet printing, it has been found difficult to find a film with a good balance of properties, yet inkjet printing is becoming a more and more popular printing technique to produce the graphics. In inkjet printing the individual ink drops are deposited on the surface. In order to achieve good image quality, the ink drops need to spread, join together, and form a substantially uniform, leveled film. Insufficient wetting results in low radial diffusion of the individual ink drops on the surface of the substrate (also referred to as "dot gain"), low color density, and banding effects (e.g., gaps between rows of drops).

Inkjet printing is emerging as the digital printing method of choice due to its good resolution, flexibility, high speed, and affordability. Inkjet printers operate by ejecting, onto a receiving substrate, controlled patterns of closely spaced ink droplets. By selectively regulating the pattern of ink droplets, inkjet printers can produce a wide variety of printed features, including text, graphics, holograms, and the like. Many of the inks used in inkjet printers are solvent-based.

Ink receptive media, in particular media receptive to solvent based inks used for example in inkjet printers have been disclosed in for example US 20030235681, WO 03/002353, US 20030224150 and US 20030107635. U.S. Pat. No. 6,869,496 discloses a non-PVC based film comprising a mixture of a first and second amorphous polyester. However, it has been found that the latter non-PVC film can be further improved relative to its ink receptive properties, in particular ink receptivity relative to ink jet printing where the ink is solvent based. Generally, the raw materials constituting this film are expensive and further, the manufacturing of the film will typically require an additional feeding station at the extruder, hence complicating manufacturing of the film.

It would now be desirable to find a further printable film that can in particular be printed with solvent based inks and in particular that can be printed with solvent based inks in inkjet printers including piezo inkjet printers. Desirably, such a film is a non-PVC based printable film and is of low cost, yet providing good to excellent printing properties. It would also be desired that the film can be produced in an easy and convenient way, hence contributing to a lower cost of the produced film. It would further be desirable to find a film that can be used for producing graphics, such as for example large graphics, that can be applied to vehicles or buildings for purposes of advertisement for example. Desirably, the graphic adheres well to these substrates yet can be easily and cleanly be removed. In particular, a printable film would be desired that has good or excellent mechanical properties. Desirably, the film can be adhered to uneven surface such as for example on surfaces including rivets and the film is not prone to or has limited popping up, i.e. showing detachment from the uneven surface. Desirably, the film has long term durability allowing the graphic to be used for an extended period of time, e.g. several years, in for example an outdoor application. Desirably, the printable films can be easily printed and can be handled and applied easily and conveniently.

In a particular aspect, the present invention provides a film having a polyester layer comprising a blend of amorphous polyester and a copolymer of an olefin and a hydrocarbon ester of an acrylic acid, wherein the amount of copolymer is at least 30 parts per 100 parts by weight of amorphous polyester and wherein the polyester layer exhibits an E-modulus at 23° C. of at least 200 N/mm$^2$.

The term 'polyester layer' in connection with this application is merely used for sake of ease of understanding in designating the layer of the film comprising the amorphous polyester and the copolymer of an olefin and hydrocarbon ester of an acrylic acid without the intention to limit the composition of the layer. Accordingly, the polyester layer may contain additional components and the quantities of any of the components in the layer including the polyester can vary without the term polyester layer being intended to limit the composition of the layer.

The film is typically of low cost, yet provides good to excellent printability, in particular by solvent based inks Accordingly, for sake of convenience, the film may also be referred to hereinafter as printable film. The film can be printed well with inkjet printers including piezo inkjet printers using solvent based inks. In a particular aspect of the present invention, the polyester layer may be a self-supported layer and thus the polymeric film may consist of a single layer formed by the polyester layer. Hence, the first major side of the polyester layer defines the printable surface of the printable film and the surface on the opposite second major side of the polyester layer may be provided directly with an adhesive layer. Optionally, one or more primer layers may be provided between the surface of the polyester layer and the adhesive layer or the surface may be corona treated for improving adherence of the adhesive layer thereto.

In a further aspect, there is provided a method of making a graphic suitable for application on vehicles or buildings, the method comprising printing of an ink composition on the polyester layer of the film.

In yet a further aspect, there is provided a graphic comprising an ink composition printed on the polyester layer of the printable film.

In a still further aspect of the invention there is provided a method of applying a graphic comprising adhering the graphic to a vehicle or a building.

DETAILED DESCRIPTION

The following is a summary of embodiments according to the invention:
1. Film having a polyester layer comprising a blend of amorphous polyester and a copolymer of an olefin and a hydrocarbon ester of an acrylic acid, wherein the amount of copolymer is at least 30 parts per 100 parts by weight of amorphous polyester and wherein the polyester layer exhibits an E-modulus at 23° C. of at least 200 N/mm².
2. Film according to embodiment 1 wherein said film has opposite first and second major sides and wherein said polyester layer defines the surface at the first major side.
3. Film according to embodiment 2 wherein said second major side comprises an adhesive layer.
4. Film according to embodiment 3 wherein said adhesive layer comprises a pressure sensitive adhesive.
5. Film according to any of the previous embodiments wherein said film is a single layer film consisting of said polyester layer.
6. Film according to embodiment any of embodiments 1 to 4 wherein said film is a multi-layer film at least one of said layers comprising said polyester layer.
7. Film according to any of the previous embodiments wherein said amorphous polyester has a glass transition temperature of at least 0° C.
8. Film according to any of the previous embodiments wherein the amorphous polyester has an E-modulus of at least 200 N/mm².
9. Film according to any of the previous embodiments wherein the amount of the copolymer is between 50 and 110 parts by weight per 100 parts of amorphous polyester.
10. Film according to any of the previous embodiments wherein said hydrocarbon ester of an acrylic acid is selected from the group consisting of alkyl acrylates and alkyl methacrylates.
11. Film according to any of the previous embodiments wherein the copolymer is a copolymer consisting of repeating units of an alpha olefin and one or more alkyl acrylates or methacrylates.
12. Film according to embodiment 11 wherein said one or more alkyl acrylates or methacrylates are selected from amongst alkyl acrylates or methacrylates of which the alkyl group has 1 to 8 carbon atoms.
13. Film according to any of the previous embodiments wherein said polyester layer further comprises one or more inorganic fillers.
14. Film according to embodiment 13 wherein the inorganic filler comprises calcium carbonate, titanium dioxide or a mixture thereof.
15. Film according to any of embodiments 13 or 14 wherein the amount of inorganic filler is between 10 and 50% by weight based on the total weight of the polyester layer.
16. Film according to any of the previous embodiments wherein the E-modulus at 23° C. of the polyester layer is between 200 N/mm² and 1000 N/mm².
17. A method of making a graphic suitable for application on vehicles or buildings, the method comprising printing of an ink composition on a film as defined in any of embodiments 1 to 16 and wherein said ink composition is printed on said polyester layer.
18. A method according to embodiment 17 wherein said ink composition comprises organic solvent.
19. A method according to any of embodiments 17 or 18 wherein an image is printed.
20. A graphic comprising an ink composition printed on the polyester layer of a film as defined in any of embodiments 1 to 16.
21. A method of applying a graphic comprising adhering a graphic as defined in embodiment 20 to a vehicle or a building.

The polyester layer of the polymeric film comprises a blend of amorphous polyester and a copolymer of an olefin and a hydrocarbon ester of an acrylic acid. A mixture of polyester may be used but typically, substantially all polyester in the polyester layer of the film is amorphous. Generally, the amount of crystallinity of polyester in the polyester layer is less than 5% by weight, for example not more than 1% by weight or not more than 0.5% by weight based on the total weight of polyester in the polyester layer. Crystallinity of polyester or a mixture of polyesters may be determined by Differential Scanning calorimetry (DSC) according to the test method described in DIN 53765.

Any suitable substantially amorphous polyester can be used as amorphous polyester in the polyester layer. Suitable amorphous polyesters include thermoplastic aromatic and/or linear saturated homo- or copolymer polyester resins. More specifically suitable amorphous polyesters having high weight average molecular weight (Mw) are desirable in order to minimize migratory constituents. High Mw polyesters preferably include polyesters having a Mw from about 30,000 to about 150,000, more preferably about 40,000 to about 120,000, most preferably about 50,000 to about 90,000. Examples of suitable polyesters include amorphous polyester resins of commercially available under the series VITEL brand from Bostik, Middleton, Mass., USA like VITEL 1070B and 1750B and polyesters for the EASTAR brand available from EASTMAN such as EASTAR 6763. Other examples include amorphous polyester resins commercially available under the series DYNAPOL brand from Huls AG, Marl, Germany. In a particular embodiment the amorphous polyester has a glass transition temperature (Tg) of at least 0° C., for example at least 25° C. or at least 50° C. Typically, the amorphous polyester is a hard polyester having an E-modulus of at least 200 N/mm², for example at least 250 or at least 300 N/mm².

The polyester layer of the polymeric film includes a copolymer of an olefin and a hydrocarbon ester of an acrylic acid. Within the context of this invention, the term 'acrylic' should be understood to include methacrylic. The hydrocarbon ester is typically an aliphatic ester and includes in particular, linear or branched alkyl esters. Included therein are also alkyl esters that include one or more aliphatic rings, ie that include a cyclic moiety. In a particular embodiment, the hydrocarbon ester of the acrylic acid is an alkyl ester of acrylic or methacrylic acid for example a linear or branched alkyl ester of acrylic or methacrylic acid having 1 to 12 carbon atoms in the alkyl group such as for example 1 to 8 carbon atoms or 1 to 5 carbon atoms. Examples of hydrocarbon esters of an acrylic acid include methyl(meth)acrylate, ethyl(meth)acrylate, butyl(meth)acrylate, 2-ethylhexyl acrylate and n-hexyl acrylate.

The olefin component of the copolymer is typically an alpha-olefin. Examples of olefins include ethylene, propylene, butane and isobutylene. Typically, the olefin will be selected from ethylene and propylene. Also, the copolymer may include units derived from different olefins. The copolymer can be a random copolymer as well as block-copolymer. Typically, the amount of repeating units in the copolymer derived from the hydrocarbon ester of an acrylic acid is between 5% by weight and 40% by weight, for example between 10% by weight and 35% by weight. Particular examples of copolymers include a copolymer of ethylene and methyl acrylate, a copolymer of ethylene and ethyl acrylate, a copolymer of ethylene and butyl acrylate. Commercially available copolymers that can be used include Lotryl™ 30BA02, Lotryl™ 29MA03 and Lotryl™ 24MA005 all available from Arkema.

The amount of the copolymer used in the polyester layer is at least 30 parts by weight per 100 parts by weight of amorphous polyester. In a particular embodiment, the amount of copolymer is at least 40 parts by weight or at least 45 parts by weight or at least 50 parts by weight per 100 parts by weight of amorphous polyester. In an exemplary embodiment, the amount of copolymer is between 50 and 110 parts by weight per 100 parts by weight of amorphous polyester.

The polyester layer further may include one or more inorganic fillers. The inorganic filler may be chosen to have an average particle size of from about 0.1 to 25 microns and may be any shape including amorphous shapes, spindles, plates, diamonds, cubes, needles, fibers and spheres. Generally, the inorganic filler will be spherical. Examples of inorganic filler components include solid or hollow glass, ceramic or metal particles, microspheres or beads; zeolite particles; inorganic compounds including, but not limited to metal oxides such as titanium dioxide, alumina and silicon dioxide; metal, alkali- or alkaline earth carbonates, silicates, metasilicates or sulfates; kaolin, talc, clays, carbon black and the like.

Particularly useful inorganic fillers include crystalline and amorphous silica, clay particles, aluminum silicate and titanium dioxide. Preferably such fillers are coated to reduce agglomeration and improve dispersability. Preferred inorganic fillers include titanium dioxide.

To enhance durability of the polyester layer, especially in outdoor environments exposed to sunlight, a variety of commercially available stabilizing chemicals can be added optionally to the primer compositions. In particular, UV light stabilizers may be added. Ultraviolet light stabilizers can be present in amounts ranging from about 0.1 to about 5 weight percent of the total primer or polyester layer.

In general, the polyester layer is typically substantially free of colorant. However, it may also contain colorants to provide a uniform background colored film.

The thickness of the polyester layer of the polymeric film is typically between 0.05 and 0.3 mm, for example 0.08 to 0.2 mm. The polyester layer can be used on its own without the need of a supporting film or co-extruded layer. Hence, the polyester layer may be used as a self-supported polymeric film or in other words, the polyester layer may define the polymeric film. It has been found that the polyester layer can provide good to excellent printability combined with excellent mechanical properties, including high elongation at break without the need for a supporting film. Accordingly, the thickness of the polymeric film is generally between 0.05 and 0.3 mm, for example between 0.08 and 0.2 mm.

The polyester layer exhibits an E-modulus at 23° C. of at least 200 N/mm$^2$. In a particular embodiment, the E-modulus is at least 250 or at least 300 N/mm$^2$. Generally, the E-modulus is between 200 N/mm$^2$ and 1000 N/mm$^2$, for example between 250 N/mm$^2$ and 800 N/mm$^2$ or between 200 and 700 N/mm$^2$. The E-modulus is measured according to DIN 53547.

In a particular embodiment, the film is a multi-layer film comprising as one of the layers, the polyester layer of the present invention. In such a multi-layer film, the polyester layer should define the surface of at least one of the opposite major sides of the multi-layer printable film such that the surface defined by the polyester layer can be used as an ink receptive surface or printable surface. Typically, the thickness of a multilayer printable film will be similar as that of a single layer film and the polyester layer may have a thickness varying over a wide range.

In a particular embodiment, the printable film includes an adhesive layer on the second major side, ie the side opposite to the side that has a printable surface defined by the polyester layer. As the polyester layer can readily be used as a self supporting layer, the adhesive layer may be provided directly to the polyester layer. The adhesive may be applied by any means known in the art including melt-coating, transfer coating, solvent coating, lamination and extrusion or coextrusion. The adhesive layer may be activated by pressure, heat, solvent or any combination thereof and may be of any type based on a poly($\alpha$-olefin), a block copolymer, an acrylate, a rubber/resin, or a silicone. The adhesive may be applied at conventional coating weights (e.g., 0.0001 to 0.02 g/cm$^2$) using any conventional coating means such a slot die or a gravure roll. Where necessary or desired to improve the adhesion of the adhesive layer to the polymeric film and in particular to the polyester layer, the polymeric film or polyester layer may be corona treated or conventional primer coating may be provided.

In a particular embodiment, a pressure sensitive adhesive (PSA) is used. Pressure sensitive adhesives useful in the present invention can be self-tacky or require the addition of a tackifier. Particularly suitable adhesives for use in the present invention include pressure sensitive adhesive based on an acrylic polymer. Examples of adhesives include PSA's, hot melt or heat activated adhesives that are the pressure sensitive at the time of application such as pressure sensitive adhesives disclosed in U.S. Pat. No. 4,994,322 (Delgado et al), U.S. Pat. No. 4,968,562 (Delgado), EP 0 570 515, and EP 0 617 708; and the pressure sensitive adhesives disclosed in U.S. Pat. Nos. 5,296,277 and 5,362,5165 (both Wilson et al) and U.S. Pat. No. 5,141,790 (Calhoun et al) and WO 96/1687 (Keller et al) and any other type of PSA disclosed in Handbook of Pressure-Sensitive Adhesives, Ed. D. Satas, 2.sup.nd Edition, Von Nostrand Reinhold, N.Y., 1989. Other examples of PSA's are, described in U.S. Pat. No. Re 24,906 (Ulrich), U.S. Pat. No. 4,833,179 (Young et al), U.S. Pat. No. 5,209,971 (Babu et al), U.S. Pat. No. 2,736,721 (Dester) and U.S. Pat. No. 5,461,134 (Leir et al) and in the Encyclopedia of Polymer Science and Engineering vol. 13, Wiley-Interscience Publishers, New York, 1988, and Encyclopedia of Polymer Scieinced and Engineering, vol. 13, Wiley-Interscience Publishers, New York, 1964. Acrylate-based PSA's which include those described in U.S. Pat. No. 4,181,752 (Clemens et al) and U.S. Pat. No. 4,418,120 (Kealy et al), WO 95/13331 and in Handbook of Pressure-Sensitive Adhesives, Ed. D. Satas, 2.sup.nd Edition.

Preferably the adhesive layer is a removable adhesive layer. For purposes of this invention, an adhesive is considered to be "removable", if after final application to an intended substrate the sheet material can be removed without damage to the substrate at the end of the intended life of the sheet material at a rate in excess of 25 feet/hour (7.62 meters/hour) by hand with the optional use of heat.

In a particular embodiment, the adhesive layer is a repositionable adhesive layer. For the purposes of this invention, "repositionable" refers to the ability to be, at least initially, repeatedly adhered to and removed from a substrate without substantial loss of adhesion capability. A repositionable adhesive usually has a peel strength, at least initially, to the substrate surface lower than that for a conventional aggressively tacking PSA. Suitable repositionable adhesives include the adhesive types used on CONTROLTAC Plus Film brand and on SCOTCHLITE Plus Sheeting brand, both made by 3M Company, St., Paul, Minn., USA.

The application of a topologically structured adhesive layer or an adhesive layer having at least one microstructured surface is particularly advantageous. Upon application of a multi-layer sheet material comprising such a structured adhesive layer to a substrate surface, a network of channels or the like exists between the multi-layer sheet material and the substrate surface. The presence of such channels or the like allows air to pass laterally through the adhesive layer and thus allows air to escape from beneath the multi-layer sheet material and the surface substrate during application.

Topologically structured adhesives may also be used to provide a repositionable adhesive. For example, relatively large scale embossing of an adhesive has been described to permanently reduce the pressure sensitive adhesive/substrate contact area and hence the bonding strength of the pressure sensitive adhesive (See EP 0 279 579) Various topologies include concave and convex V-grooves, diamonds, cups, hemispheres, cones, volcanoes and other three dimensional shapes all having top surface areas significantly smaller than the base surface of the adhesive layer. In general, these topologies provide adhesive sheets, films and tapes with lower peel adhesion values in comparison with smooth surfaced adhesive layers. In many cases, the topologically structured surface adhesives also display a slow build in adhesion with increasing contact time.

An adhesive layer having a microstructured adhesive surface may comprise a uniform distribution of adhesive or composite adhesive "pegs" over the functional portion of an adhesive surface and protruding outwardly from the adhesive surface. A multi-layer sheet material comprising such an adhesive layer provides a sheet material that is repositionable when it is laid on a substrate surface (See U.S. Pat. No. 5,296,277). Such an adhesive layer also require a co-incident microstructured release liner to protect the adhesive pegs during storage and processing. The formation of the microstructured adhesive surface can be also achieved for example by coating the adhesive onto a release liner having a corresponding micro-embossed pattern or compressing the adhesive e.g. a PSA, using against a release liner having a corresponding micro-embossed pattern as described in WO 98/29516.

If desired, the adhesive layer may comprise multiple sub-layers of adhesives to give a combination adhesive layer assembly. For example, the adhesive layer may comprise a sub-layer of a hot-melt adhesive with a continuous or discontinuous overlayer of PSA or repositionable adhesive.

The adhesive layer may optionally be protected with a release liner. The release liner is preferably adhesive-repellant and more specifically comprises paper or film, which has been coated or modified with compounds of low surface energy relative to the adhesive applied. Organo silicone compounds, fluoropolymers, polyurethanes and polyolefins can serve this purpose. The release liner can also be a polymeric sheet produced from polyethylene, polypropylene, PVC, polyesters with or without the addition of adhesive-repellant compounds. As mentioned above, the release liner may have a microstructured or micro-embossed pattern. Suitable micro-embossed liners and their method of production are described in WO 98/29516. The release liner can have a thickness of 25 to 250 micrometer, preferably 80 to 120 micrometer.

Generally, the polyester layer is prepared from a melt-blend obtained by feeding a mixture of the components of a desired composition of the polyester layer into a hopper of an extruder. In a particular embodiment, the mixture may include the polyester, the copolymer and further components. In an embodiment where an inorganic filler is used, a masterbatch or pre-mixture of amorphous polyester and an inorganic filler such as titanium oxide may be prepared in advance and then fed into the hopper together with the copolymer. The mixture is conveyed through the extruder that is heated, preferably with individually controlled temperature zones heated at increasing temperatures toward the extruder exit to a slot die. It is typically preferred to utilize a suitable mixing device such as a static mixer between the extruder exit and the slot die. In passing through the extruder, and, where used, the static mixer, the mixture of copolymer and additional components are heated to a temperature at or above the glass transition temperature of the copolymer and the amorphous polyester (but below the thermal degradation temperature of the polymers) and mixed to form a melt-blend solution that is extruded through a slot die as a film layer onto a chill role, for example a chrome plated role, maintained at a suitable temperature below the glass transition temperature of the copolymer. In a particular embodiment, a rubber role may be pressing against the chill role defining a nip between the chill role and the rubber role into which the film can be extruded. This particular embodiment may be useful to impart a glossy appearance to the polyester layer when desired.

In a preferred embodiment, the polyester layer will be extruded as a self-supported film. An adhesive may be co-extruded with the polyester layer but is preferably applied after extrusion of the polyester layer into a self-supported film. In another embodiment, the polyester layer may also be co-extruded with a supporting layer if desired but this will generally not be preferred as a more cost effective printable film can be obtained by extruding the polyester layer as a self-supported film.

Generally, the polyester layer will not be oriented. That is, the polyester layer will not be subjected to an orientation device intended to orient the polyester layer in the longitudinal (machine) direction or in the transverse direction perpendicular thereto. Hence, in a particular embodiment, the polyester layer will be an unoriented layer. Typically, the polyester layer obtained will have an elongation at break in the machine direction as well as in the transverse direction of at least 100%, typically at least 200% or at least 300%. As a result excellent mechanical properties may be combined with good printing properties even without the need to use a support layer. In another embodiment, the polyester layer may be oriented in the longitudinal or machine direction. Typically, such orientation may be caused in the extrusion process of making the polyester layer where following extrusion and conveying of the extruded layer to a take-up roller, the layer may be stretched somewhat while its temperature is still near the glass temperature of the polyester layer.

In accordance with the present invention, the printable film is used to make graphics, in particular graphics for application on vehicles or buildings, either to the exterior of the building for example a glass pane or a wall or in the interior thereof such as on floors or walls. Vehicles to which the graphic might be applied include any transportation vehicle including cars, trucks, busses, metros and trains as well as airplanes. Generally, the graphic is used for purposes of advertisement and will typically include an advertisement message.

In an embodiment, the graphic may be obtained by printing an ink composition on the polyester layer of the printable film. Generally, an image such as an advertisement message may be printed on the printable film. Typically, printing will be done by inkjet printing including piezo inkjet printing.

Suitable inks include those that have a viscosity ranging from about 3 to about 30 centipoise at the printhead operating temperature. Such inks preferably have a viscosity below about 25 centipoise, and more preferably below about 20 centipoise at the desired ink jetting temperature (typically from ambient temperature up to about 65° C.).

The ink compositions typically comprise a binder, plasticizer, organic solvent, pigment particles and optional additives such as surfactants (e.g. fluorochemical), antifoaming agent (e.g. silica and silicone oil), stabilizers, etc. Piezo ink jet compositions characteristically have moderate to low surface tension properties. Preferred formulations have a surface tension in the range of from about 20 mN/m to about 50 mN/m and more preferably in the range of from about 22 mN/m to about 40 mN/m at the printhead operating temperature. Further, piezo ink compositions typically have Newtonian or substantially Newtonian viscosity properties. A Newtonian fluid has a viscosity that is at least substantially independent of shear rate. As used herein, the viscosity of a fluid will be deemed to be substantially independent of shear rate, and hence at least substantially Newtonian, if the fluid has a power law index of 0.95 or greater. The power law index of a fluid is given by the expression $$\eta = m\gamma^{n-1}$$

wherein $\eta$ is the shear viscosity, $\gamma$ is the shear rate in $s^{-1}$, m is a constant, and n is the power law index. The principles of the power law index are further described in C. W. Macosko, *Rheology: Principles, Measurements, and Applications*, ISBN #1-56081-579-5, p. 85.

In a typical embodiment, the inks employed in the method of making the graphic are non-aqueous, meaning that the ink is substantially free of water. In the case of non-aqueous solvent-based inks, the solvent of the ink composition may be a single solvent or a blend of solvents. Suitable solvents include alcohols such as isopropyl alcohol (IPA) or ethanol; ketones such as methyl ethyl ketone (MEK), methyl isobutyl ketone (MIBK), diisobutyl ketone (DIBK); cyclohexanone, or acetone; aromatic hydrocarbons such as toluene; isophorone; butyrolactone; N-methylpyrrolidone; tetrahydrofuran; esters such as lactates, acetates, including propylene glycol monomethyl ether acetate such as commercially available from 3M under the trade designation "3M Scotchcal Thinner CGS10" ("CGS10"), 2-butoxyethyl acetate such as commercially available from 3M under the trade designation "3M Scotchcal Thinner CGS50" ("CGS50"), ethyl-3-ethoxy propionate such as commercially available from 3M under the trade designation "3M Scotchcal Thinner CGS30" ("CGS30"), diethylene glycol ethyl ether acetate (DE acetate), ethylene glycol butyl ether acetate (EB acetate), dipropylene glycol monomethyl ether acetate (DPMA), iso-alkyl esters such as isohexyl acetate, isoheptyl acetate, isooctyl acetate, isononyl acetate, isodecyl acetate, isododecyl acetate, isotridecyl acetate or other iso-alkyl esters; combinations of these and the like.

In general, organic solvents tend to dry more readily and thus are preferred solvents for inkjet compositions. As used herein, "organic solvent" refers to a liquid having a solubility parameter greater than 7 $(cal/cm^3)^{1/2}$. Further, organic solvents typically have a boiling point of less than 250° C. and a vapor pressure of greater than 5 mm of mercury at 200° F. (93° C.). Highly volatile solvents, such as MEK and acetone, are typically avoided, as such solvents dry too quickly resulting in nozzle clogging at the print heads. Further, highly polar solvents, such as low molecular weight alcohols and glycols, tend to have too high of a solubility parameter for adequate ink uptake.

In a particular embodiment, the ink may comprise radiation curable ink Radiation curable ink compositions comprise one or more radiation curable monomer(s), oligomer(s), macromonomer(s), polymer(s) or various mixtures of such components. "Radiation curable" refers to functionality directly or indirectly pendant from the backbone that reacts (e.g. crosslinks) upon exposure to a suitable source of curing energy. Suitable radiation crosslinkable groups include epoxy groups, (meth)acrylate groups, olefinic carbon-carbon double bonds, allyloxy groups, alpha-methyl styrene groups, (meth)acrylamide groups, cyanate ester groups, vinyl ethers groups, combinations of these, and the like. Free radically polymerizable groups are typically preferred. Of these, (meth)acryl moieties are most preferred. The term "(meth)acryl", as used herein, encompasses acryl and/or methacryl.

The energy source used for achieving crosslinking of the radiation curable functionality may be actinic (e.g., radiation having a wavelength in the ultraviolet (UV) or visible region of the spectrum), accelerated particles (e.g., electron beam (EB) radiation), thermal (e.g., heat or infrared radiation), or the like with UV and EB being preferred. Suitable sources of actinic radiation include mercury lamps, xenon lamps, carbon arc lamps, tungsten filament lamps, lasers, electron beam energy, sunlight, and the like.

The radiation curable ingredient may be mono-, di-, tri-, tetra- or otherwise multifunctional in terms of radiation curable moieties. The oligomers, macromonomers, and polymers may be straight-chained, branched, and/or cyclic with branched materials tending to have lower viscosity than straight-chain counterparts of comparable molecular weight.

A preferred radiation curable ink composition comprises a radiation curable reactive diluent, one or more oligomers(s), macromonomer(s) and polymer(s), and one or more optional adjuvants. For outdoor applications, polyurethane and acrylic-containing monomer(s), macromonomer(s), oligomer(s) and polymer(s) are preferred. The higher molecular weight species also tend to be readily soluble in reactive diluents.

Examples of commercially available (meth)acrylated urethanes and polyesters include those commercially available from Henkel Corp., Hoboken, N.J. under the trade designation "Photomer"; commercially available from UCB Radcure Inc., Smyrna, Ga. under the trade designation "Ebecryl"; commercially available from Sartomer Co., Exton, Pa. under the trade designation "Sartomer CN"; commercially available from Akcross Chemicals, New Brunswick, N.J. under the trade designation "Actilane"; and commercially available from Morton International, Chicago, Ill. under the trade designation "Uvithane".

Provided that at least one of the ingredients is radiation curable, the radiation curable ink may comprise non-radiation curable ingredients as well. For example, polymers such as polyurethanes, acrylic material, polyesters, polyimides, polyamides, epoxies, polystyrene as well as substituted polystyrene containing materials, silicone containing materials, fluorinated materials, combinations thereof, and the like, may be combined with reactive diluents (e.g. monomers).

Suitable inks for use in the invention include piezo ink compositions commercially available from 3M Company ("3M"), St. Paul, Minn. under the trade designations "3M Scotchcal 3700 Series Inks", "3M Scotchcal 1600 Series Inks" "3M Scotchcal 6700 Series Inks" and ink compositions available from Ultraview Inkware of VUTEk, Meredith, N.H. under the trade designation "UltraVu". A preferred piezo ink jet composition is described in U.S. Pat. No. 6,113,679 (Adkins), incorporated herein by reference. Radiation curable inks are commercially available from 3M under the trade designations "3M Scotchcal 5000UV Series Inks" and commercially available from SunJet of Sun Chemicals, For Lee, N.J. under the trade designation "CrystalUFX Series".

The graphic produced with the printing method comprise the printable film with ink printed on the polyester layer of the printable film. The ink will typically be printed as an image and the image may be text, graphics, coding (e.g. bar coding), etc., being comprised of a single color, multi-colored or being unapparent in the visible light spectrum.

The graphic is typically adhered to a suitable substrate such as a building or a vehicle through an adhesive layer of the printable film. The nature of the substrate may vary widely and include such substrates as glass, polycarbonate, low energy surfaces including low energy surface paints and metal such as steel or aluminium.

The invention is further described with reference to the following examples without however the intention to limit the invention thereto.

EXAMPLES

In the following example all parts and percentages are by weight unless otherwise stated.

TABLE 1

Materials used

| Component | Composition | Trade Name | Supplier |
| --- | --- | --- | --- |
| Polymer A | Amorphous, saturated, linear PET | Eastar 6763 | Eastman |
| Polymer B | Random copolymer of Ethylene and Methyl Acrylate with content of 27-31% Methyl Acrylate | Lotryl 24MA005 | Arkema |
| Pigment A | Titanium Dioxide compounded with PET/ ratio: 65:35 | Renol White PTX 506 | Clariant |
| Pigment B | Titanium Dioxide compounded with PETG/ratio: 65:35 | Renol White NG00025564-ZA | Clariant |
| Polymer C | Semi-crystalline PBT | Pocan B 1700 | Lanxess |

In the above table, PET stands for polyethylene terephthalate, PETG stands for a copolyester of terephthalate and ethylene glycol, PBT stands for polybutylene terephthalate, and LDPE stands for Low Density Polyethylene.

Making of the Ink Receptive Films

The film composition detailed in the examples below were obtained by blending the constituents thereof for 10 minutes in a tumbling container. The obtained mixture was then extruded to a film thickness of 0.08 mm using a single screw extruder having 45 mm screw, an L/D of 30 and 3 screw zones at a temperature of 215° C. for zone 1, 255° C. for zone 2 and 270° C. for the third zone. The die was set to 270° C. and the film was extruded on a chrome plated role maintained at a temperature of 40° C. The extrusion speed was 7 m/min.

The following films were produced with the above method:

Example 1

100 parts by weight of Polymer A
80 parts by weight of Polymer B
0 parts by weight of Pigment A
0 parts by weight of Pigment B Example 2

100 parts by weight of Polymer A
60 parts by weight of Polymer B
0 parts by weight of Pigment A
0 parts by weight of Pigment B Example 3

100 parts by weight of Polymer A
50 parts by weight of Polymer B
0 parts by weight of Pigment A
0 parts by weight of Pigment B Example 4

100 parts by weight of Polymer A
50 parts by weight of Polymer B
30 parts by weight of Pigment A
0 parts by weight of Pigment B Example 5

100 parts by weight of Polymer A
50 parts by weight of Polymer B
40 parts by weight of Pigment A
0 parts by weight of Pigment B Example 6

100 parts by weight of Polymer A
50 parts by weight of Polymer B
0 parts by weight of Pigment A
15 parts by weight of Pigment B Example 7

100 parts by weight of Polymer A
50 parts by weight of Polymer B
0 parts by weight of Pigment A
25 parts by weight of Pigment B Example 8

100 parts by weight of Polymer A
50 parts by weight of Polymer B
0 parts by weight of Pigment A
30 parts by weight of Pigment B Example 9

100 parts by weight of Polymer A
50 parts by weight of Polymer B 0 parts by weight of Pigment A
40 parts by weight of Pigment B Comparative Example 1

100 parts by weight of Polymer C
43 parts by weight of Polymer B
10 parts by weight of Pigment A Comparative Example 2

100 parts by weight of Polymer C
35 parts by weight of Polymer B
10 parts by weight of Pigment A Comparative Example 3

100 parts by weight of Polymer C
27 parts by weight of Polymer B
20 parts by weight of Pigment A Test Methods:
Tensile Strength and Elongation at Break Tensile strength and elongation at break of the extruded polymeric films was measured according to DIN (Deutsche Industrie Norm) 53547 using a commercially available tensile tester available as Model 005 from Zwick GmbH (Ulm, Germany) employing a software package testXpert™ 2, Version 3.2, with the following exceptions:

Tension on the sample was not related to the smallest cross-sectional area of the original sample, but was related to the average cross-sectional area of the original sample Test specimens were prepared by cutting film samples having their length in the machine direction. The film strips were uniformly 2,54 cm wide, rather than the "dog-bone" shape traditionally employed. The ends of the strips to be clamped in the tester jaws was wrapped with paper-based adhesive tape commonly employed for paint masking available as #220 Masking Tape from 3M Company, St. Paul, Minn., USA so that 100 mm of specimen length was present between the tape ends.

The sample strip had a total length of 140 mm comprising 100 mm free sample and 20 mm covered with tape each end.

Five samples were measured and the values averaged.

The thickness of the film samples was measured in three places and averaged.

The jaws of the tester were separated at a rate of 300 mm/min.

E-Modulus

E-Modulus was measured according to DIN (Deutsche Industrie Norm) 53547 at 23° C. The modulus between 0.5% and 1.0% elongation was recorded as the E-Modulus. Test specimens were prepared in the manner described above for tensile strength and elongation at break. The speed at which the jaws were drawn apart for the modulus test was 5 mm/min.

The E-modulus of the films was measured on five different specimens and recorded in N/mm². The following table lists the results:

| Ex. No. | E-Modulus [N/mm²] | Force at break [N] | Elongation [%] |
| --- | --- | --- | --- |
| 1 | 464 | 29 | 313 |
| 2 | 568 | 36 | 317 |
| 3 | 776 | 47 | 347 |
| 4 | 933 | 59 | 411 |
| 5 | 966 | 52 | 333 |
| 6 | 847 | 53 | 414 |
| 7 | 824 | 57 | 411 |
| 8 | 1014 | 57 | 361 |
| 9 | 936 | 56 | 374 |
| C1 | 728 | 72 | 433 |
| C2 | 771 | 84 | 441 |
| C3 | 714 | 89 | 432 |

Testing on Printability
Printing Method
Test File:

Image quality was evaluated by using a test pattern consists of filled squares printed up to 250% of ink.

These pattern was down web oriented and composed out of individual color squares of the primary colors cyan, magenta, yellow, black and of the secondary colors red (magenta/yellow), green (cyan/yellow) and blue (cyan/magenta), all starting from 5% up to 100% color fill.

The red, green and blue rows were printed twice in counterrotated order. This was to print one time the 100% color fills at the end and one time at the start of the printing process.

In addition 3 color lines of tertiary colors were printed composed of red, green and blue starting from 5 up to 100% color fill combined with a fix addition of 50% from the not in this ink formulation used primary color (i.e. red is the combination of yellow and magenta, so into this color line 50% of cyan is added to each square).

At front at end of the test file the word "Test" was printed with text heights from 1 5 mm up to 7 mm One time the text was 100% of black on white color and one time white on 100% of black color.

Test Printer:

A common solvent based piezo ink jet printer was used for printing the described file onto the test substrate.

1) Mutoh Blizzard, filled with 3M Piezo Ink Jet Ink Series 600. Printer had 2× CMYK ink configuration.

The Ink Series 600 is a so called mild-solvent ink with using as major solvent 2-butoxyethylacetate (>80%) and smaller quantities of 2-methoxy-2-propyllactetate and Cyclohexanone (<10%). The flash point (open cup method) is 68° C.

RIP Software:

To process the test file for printing Onyx PosterShop Version X was used.

Ripping was done with a so called IJ Master profile we standardize for lab test prints. This master file is printing without ink restrictions, linearization or ICC profile. Due to this, prints done with this profile showing the pure ink flow on top of the media without adjustments.

Settings Used for the Test Printers:

1) Mutoh Blizzard: FAST540x720 dpi, bidirectional, using 4 pass with picture/speed weaving method. Heater settings used: pre-heater 40° C., print heater 37° C., fixing heater 45° C. and post heater 50° C.

Ink Flow/Image Quality Evaluation:

The ink flow respectively the image quality was evaluated by using the test file described above by observing characteristics such as color uniformity, edge sharpness, color bleed and overall appearance of the test print. The dryness of the ink after printing was noted by lightly touching a cotton bud or lint-free cloth to the test pattern and observing if any ink was transferred from the substrate to the cotton/cloth. All of this was evaluated on a scale of 0 to 5 with 0 being worst and 5 being best.

The printing results obtained with each of these films were as follows:

| Ex. No. | Uniformity | Sharpness | Bleed | Overall appearance | Dryness |
|---|---|---|---|---|---|
| 1 | 2 | 2 | 1 | 2 | 2 |
| 2 | 3 | 3 | 3 | 3 | 3 |
| 3 | 4 | 5 | 4 | 4 | 4 |
| 4 | 3 | 4 | 3 | 3 | 2 |
| 5 | 3 | 3 | 3 | 3 | 2 |
| 6 | 3 | 4 | 4 | 3 | 3 |
| 7 | 3 | 4 | 4 | 4 | 3 |
| 8 | 3 | 3 | 3 | 3 | 2 |
| 9 | 3 | 3 | 3 | 3 | 2 |
| C1 | 0 | 0 | 0 | 0 | 0 |
| C2 | 0 | 0 | 0 | 0 | 0 |
| C3 | 0 | 0 | 0 | 0 | 0 |

The invention claimed is:

1. Film having a polyester layer comprising
a blend of amorphous polyester and a copolymer of an olefin and a hydrocarbon ester of an acrylic acid,
wherein the amount of copolymer is at least 30 parts per 100 parts by weight of amorphous polyester and
wherein the polyester layer exhibits an E-modulus at 23° C. of at least 200 N/mm$^2$.

2. Film according to claim 1 wherein said film has opposite first and second major sides and wherein said polyester layer defines the surface at the first major side.

3. Film according to claim 2 wherein said second major side comprises an adhesive layer.

4. Film according to claim 1 wherein said film is a single layer film consisting of said polyester layer.

5. Film according to claim 1 wherein said amorphous polyester has a glass transition temperature of at least 0° C.

6. Film according claim 1 wherein the amorphous polyester has an E-modulus of at least 200 N/mm$^2$.

7. Film according to claim 1 wherein the amount of the copolymer is between 50 and 110 parts by weight per 100 parts of amorphous polyester.

8. Film according to claim 1 wherein the copolymer is a copolymer consisting of repeating units of an alpha olefin and one or more alkyl acrylates or methacrylates.

9. Film according to claim 1 wherein the E-modulus at 23° C. of the polyester layer is between 200 N/mm$^2$ and 1000 N/mm$^2$.

10. A method of making a graphic suitable for application on vehicles or buildings, the method comprising printing of an ink composition on a film as defined in claim 1 and wherein said ink composition is printed on said polyester layer.

11. A method according to claim 10 wherein said ink composition comprises organic solvent.

12. A method according to claim 10 wherein an image is printed.

13. A graphic comprising the film of claim 1 having an ink composition printed on the polyester layer of a film.

14. A method of applying a graphic comprising adhering a graphic as defined in claim 13 to a vehicle or a building.

15. A film according to claim 1 wherein the polyester layer exhibits an E-modulus at 23° C. of at least 300 N/mm$^2$.

* * * * *